(12) United States Patent
Yang (10) Patent No.: US 8,974,945 B2
(45) Date of Patent: Mar. 10, 2015

(54) ELECTRICITY SUPPLY SYSTEM

(75) Inventor: Szu-Nan Yang, Taipei (TW)

(73) Assignees: Prologium Technology, Co., Ltd., Taipei County (TW); Prologium Holding Inc., Grand Cayman (KY)

( * ) Notice: Subject to any disclaimer, the term of this patent is extended or adjusted under 35 U.S.C. 154(b) by 479 days.

(21) Appl. No.: 13/323,825

(22) Filed: Dec. 13, 2011

(65) Prior Publication Data

US 2012/0082870 A1   Apr. 5, 2012

Related U.S. Application Data (63) Continuation-in-part of application No. 11/755,657, filed on May 30, 2007, now abandoned.

(30) Foreign Application Priority Data

Dec. 18, 2006 (TW) ................................ 95147493 A
Dec. 22, 2006 (CN) ............................ 2006 1 0170005

(51) Int. Cl.

| | |
|---|---|
| H01M 2/16 | (2006.01) |
| H01M 2/18 | (2006.01) |
| H01M 14/00 | (2006.01) |
| H01M 4/13 | (2010.01) |
| H01M 4/58 | (2010.01) |
| H01M 2/02 | (2006.01) |
| H01M 10/42 | (2006.01) |

(52) U.S. Cl.
CPC .......... *H01M 2/0202* (2013.01); *H01M 2/1613* (2013.01); *H01M 2/1653* (2013.01); *H01M 2/1686* (2013.01); *H01M 2/18* (2013.01); *H01M 10/425* (2013.01); *H01M 2002/0205* (2013.01)
USPC ............... 429/131; 429/7; 429/129; 429/142; 429/231.95

(58) Field of Classification Search
USPC .......................... 429/7, 231.95, 129, 142, 131
See application file for complete search history.

(56) References Cited

U.S. PATENT DOCUMENTS

| | | | | |
|---|---|---|---|---|
| 7,276,881 | B2* | 10/2007 | Okumura et al. | 320/134 |
| 7,877,120 | B2* | 1/2011 | Jacobs et al. | 455/575.1 |
| 8,323,823 | B2* | 12/2012 | Kaneko | 429/158 |

* cited by examiner

*Primary Examiner* — Patrick Ryan
*Assistant Examiner* — Julian Anthony (57) ABSTRACT

An electricity supply system includes a circuit substrate, a first electrode substrate, a second electrode substrate, a first package unit, and a second package unit. The circuit substrate includes at least a separating area. The first electrode substrate includes a first current collector and a first active material layer, which is disposed opposed to the separating area and is located between the separating area and the first current collector. The second electrode substrate includes a second current collector and a second active material layer, which is disposed opposed to the separating area and is located between the separating area and the second current collector. The first and second package units are located between the first electrode substrate, the second electrode substrate and the circuit substrate respectively.

19 Claims, 6 Drawing Sheets

ELECTRICITY SUPPLY SYSTEM

This application is a Continuation in part of Ser. No. 11/755,657 filed on May 30, 2007.

BACKGROUND OF THE INVENTION

1. Field of Invention

The present invention relates to an electricity supply system, in particular to an lithium battery using a circuit substrate as a separator.

2. Related Art

In the electronic device industry, portability is one of the major trends. A portable electronic device typically requires an electricity supply system/module to supply electricity for functional components/modules. Typically, electricity supply modules (e.g., a battery module) and functional modules (e.g., a module including one or more of memory, computing, and display components) are implemented in separate units, as illustrated in the example of FIG. 1.

Figure 1:
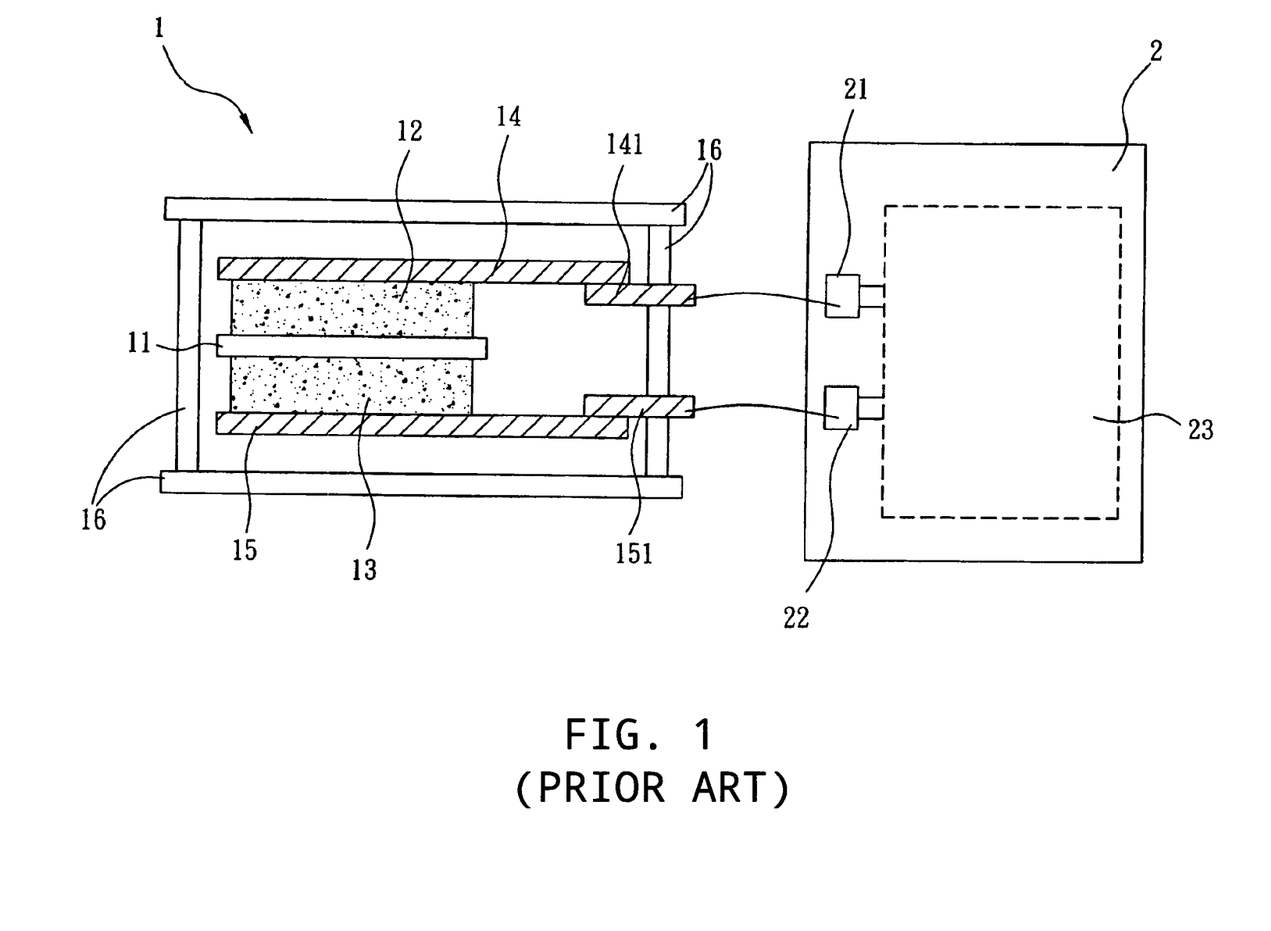
FIG. 1 illustrates the example of the cell of the prior-art lithium battery system.

FIG. 1 illustrates a battery 1 configured to supply electricity for a functional module 2. The battery 101, e.g., a lithium battery, typically includes active material layers 12 and 13 configured to perform conversation of chemical energy into electrical energy. The active material layers 12 and 13 are separated by a separator 11 to prevent short circuit between the active material layers 12 and 13.

The battery 1 may further include conductors 14 and 15 configured to collect currents and to form an electrical path between the active material layers 12 and 13 and a functional module 2. The conductors 14 and 15 are electrically coupled with contacts 21 and 22 respectively, of the functional module 2 through tabs 141 and 151 respectively. The contacts 21 and 22, in turn, are electrically coupled with a circuit 23 that includes various components for performing various functions.

The tabs 141 and 151 serve as interfaces between the battery 1 and the functional module 2 (or a charger for the battery 1). Typically, alignment between the tabs 141 and 151 and the contacts 21 and 22 are required to ensure reliable electricity supply. Requirements of precise alignment between the tabs 141 and 151 and the contacts 21 and 22 may incur significant manufacturing costs.

Further, to ensure reliable and stable electricity supply, the relative position between the tabs 141 and 151 and the contacts 21 and 22 need to be maintained. As a result, the combined electronic device that includes the battery 1 and the functional module 1 is unable to be made flexible.

If conductive wires are implemented between the contacts 21 and 22 and the tabs 141 and 151 to provide flexibility, alignment of more contact points are required, and manufacturing costs are increased. Further, the conductive wires may not be able to withstand a large number of a high frequency of bending. Damage to the wires, e.g., resulted from bending, may cause the electronic device to malfunction.

In general, the battery 1 includes a package unit 16 for enclosing various components of the battery 1 to prevent moisture intake and electrolyte leakage of the battery 1. However, the tabs 141 and 151 typically are required to protrude from the package unit 16 to perform interface functions for power supply and recharge. Typically, the package unit 16 is formed of a material that is different from the material of the tabs 141 and 151. Even if sealing means, such as solder, are applied at the junctions of the package unit 16 and the tabs 141 and 151, gaps may still exist at the junctions. Accordingly, the package unit 16 may not be able to effectively prevent electrolyte leakage and moisture intake. As a result, performance of the battery 1 is deteriorated. In order to minimize or eliminate the gaps, the manufacturing and/or material costs of the battery 1 may be increased.

As also can be appreciated from the example of FIG. 1, the battery 1 and the functional module 2 require different packages. The separate packages also incur significant manufacturing and material costs.

SUMMARY OF THE INVENTION

This invention discloses an electricity supply system, in particular to an lithium battery using a circuit substrate as a separator. The lithium battery includes a circuit substrate, a first electrode substrate, a second electrode substrate, a first package unit, and a second package unit. The circuit substrate has at least one separating area. The first electrode substrate is disposed on one side of the circuit substrate and includes a first current collector and a first active material layer. The first active material layer is disposed opposed to the separating area and is located between the separating area and the first current collector. The second electrode substrate is disposed on another side of the circuit substrate and includes a second current collector and a second active material layer. The second active material layer is disposed opposed to the separating area and is located between the separating area and the second current collector. The first package unit is located between the first electrode substrate and the circuit substrate and disposed around the edge of the first active material layer. The second package unit is located between the second electrode substrate and the circuit substrate, and disposed around the edge of the second active material layer.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

The invention provides an electricity supply unit, which is integrated in a flexible circuit board or a rigid circuit board, and an electricity system with low cost, high electric capacity, thermal stability-stable, and extra mechanic characteristic, such as repeat bends. Due to the electricity supply unit is integrated in a circuit substrate, the carrier or the solder pad are not necessary. Also, the circuit substrate is utilized as a separator. The thermal stability temperature of the circuit substrate is over 300° C. Therefore, reflow soldering method to continuously proceed SMT process, even a metal-metal eutectic process for IC, for mass-production is possible.

Figure 2:
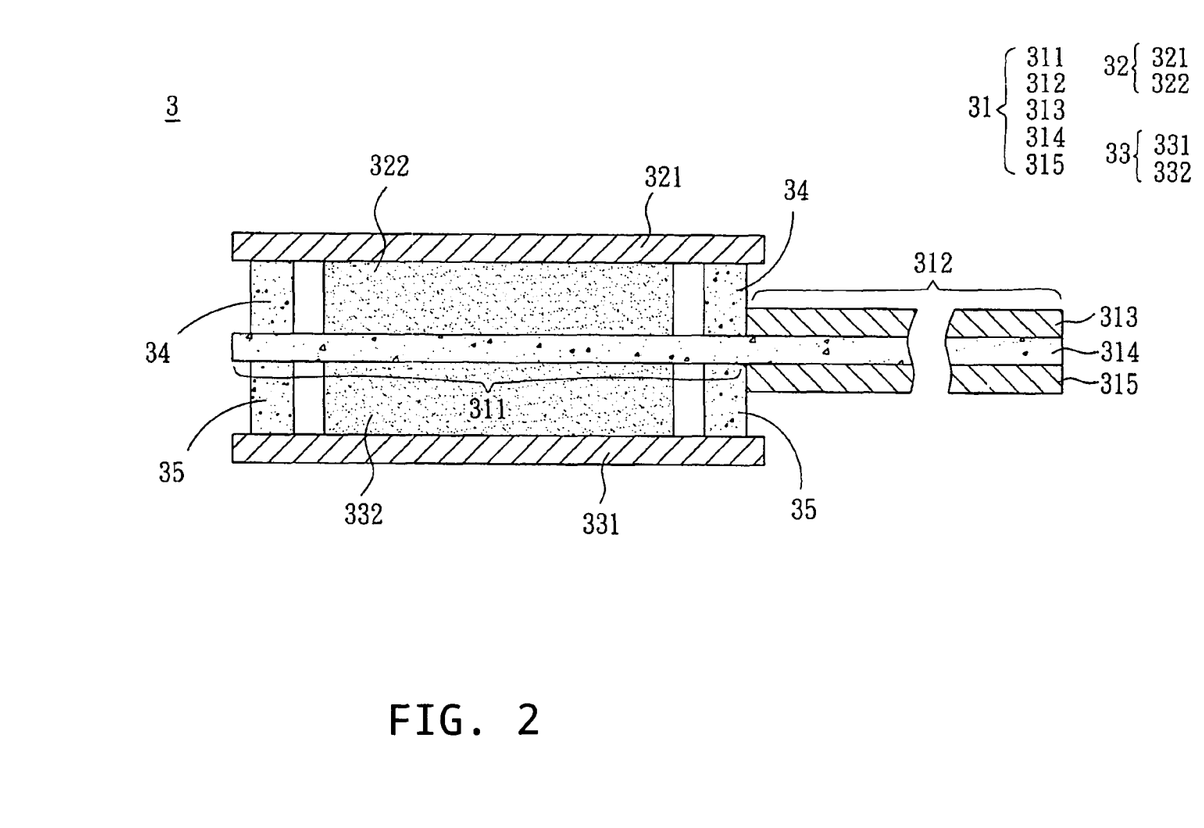
FIG. 2 illustrates the electricity supply system of the present invention.

FIG. 2 illustrates the cross-sectional view of the electricity supply system of this invention. The electricity supply system 3 of this invention includes a circuit substrate 31, a first electrode substrate 32, a second electrode substrate 33, a first package unit 34 and a second package unit 35. The circuit substrate 31 has at least one separating area 311. The first electrode substrate 32 is disposed on one side of the circuit substrate 31. And the first electrode substrate 32 includes a first current collector 321 and a first active material layer 322. The first active material layer 322 is disposed opposed to the separating area 311 and is located between the separating area 311 and the first current collector 321. The second electrode substrate 33 is disposed on another side of the circuit substrate 31. And the second electrode substrate 33 includes a second current collector 331 and a second active material layer 332. The second active material layer 332 is disposed opposed to the separating area 311 and is located between the separating area 311 and the second current collector 331. The first package unit 34 is located between the first electrode substrate 32 and the circuit substrate 31 and disposed around the edge of the first active material layer 322. The second package unit 35 is located between the second electrode substrate 33 and the circuit substrate 31 and disposed around the edge of the second active material layer 332.

In this embodiment, the circuit substrate 31 is a flexible circuit board or a rigid circuit board. As refer to FIG. 2, the circuit substrate 31 is a multilayer circuit board, which includes a first metal layer 313, a second metal layer 315 and a substrate polymer layer 314. The first metal layer 313 and the second metal layer 315 are disposed on two sides of the substrate polymer layer 314 without opposing to the separating area. And the first metal layer 313 and the second metal layer 315 are single-layer or multilayer structure. The material of the first metal layer 313 and the second metal layer 315 is copper (Cu), Aluminum (Al), nickel (Ni) or an alloy comprised of at least one of the foregoing metals. The substrate polymer layer 314 is also single-layer or multilayer structure and includes at least one substrate supporting layer and two glue layers. The material of the substrate supporting layer includes polyimide (PI), polyethylene terephthalate (PET), polyethylene naphthalate (PEN), glass fiber, and liquid crystal polymer. The material of the glue layers is PI, epoxy, acrylic acid reagent etc.

The circuit substrate 31 further includes a logic circuit area 312 adjacent to the separating area 311 and electrically connected with the first current collector 321 and the second current collector 331. The logic circuit area 312 is adapted to dispose a logic circuitry. As shown in FIG. 2, the separating area 311 is located between the first electrode substrate 32 and the second electrode substrate 33 in vertical direction, and is located between the first package unit 34 and the second package unit 35 in horizontal direction. The logic circuit area 312 is located outside the first package unit 34 and the second package unit 35 in horizontal direction. The circuit substrate 31 has three main functions:

the separating area 311 is utilized for insulation electrically and to permit ion migration between the first active material layer 322 of the first electrode substrate 32 and the second active material layer 332 of the second electrode substrate 33;

the logic circuit area 312 is utilized to output electricity directly by etched traces connecting to the outside circuit directly without extra pads;

due to the separating are 311 could be served as a carrier or matrix for other inside electric elements, the outside circuit and electric elements are integrated in the circuit substrate 31 by the logic circuit area 312. Besides, the circuit substrate 31 with high thermal stability. Therefore, reflow soldering method to continuously proceed SMT process, even a metal-metal eutectic process for IC, for mass-production is possible.

The first package unit 34 is located between the first electrode substrate 32 and the circuit substrate 31 in vertical direction, and is located between the first active material layer 322 of the first electrode substrate 32 and the logic circuit area 312 in horizontal direction. The second package unit 35 is located between the second electrode substrate 33 and the circuit substrate 31 in vertical direction, and is located between the second active material layer 332 of the second electrode substrate 33 and the logic circuit area 312 in horizontal direction.

Figure 3:
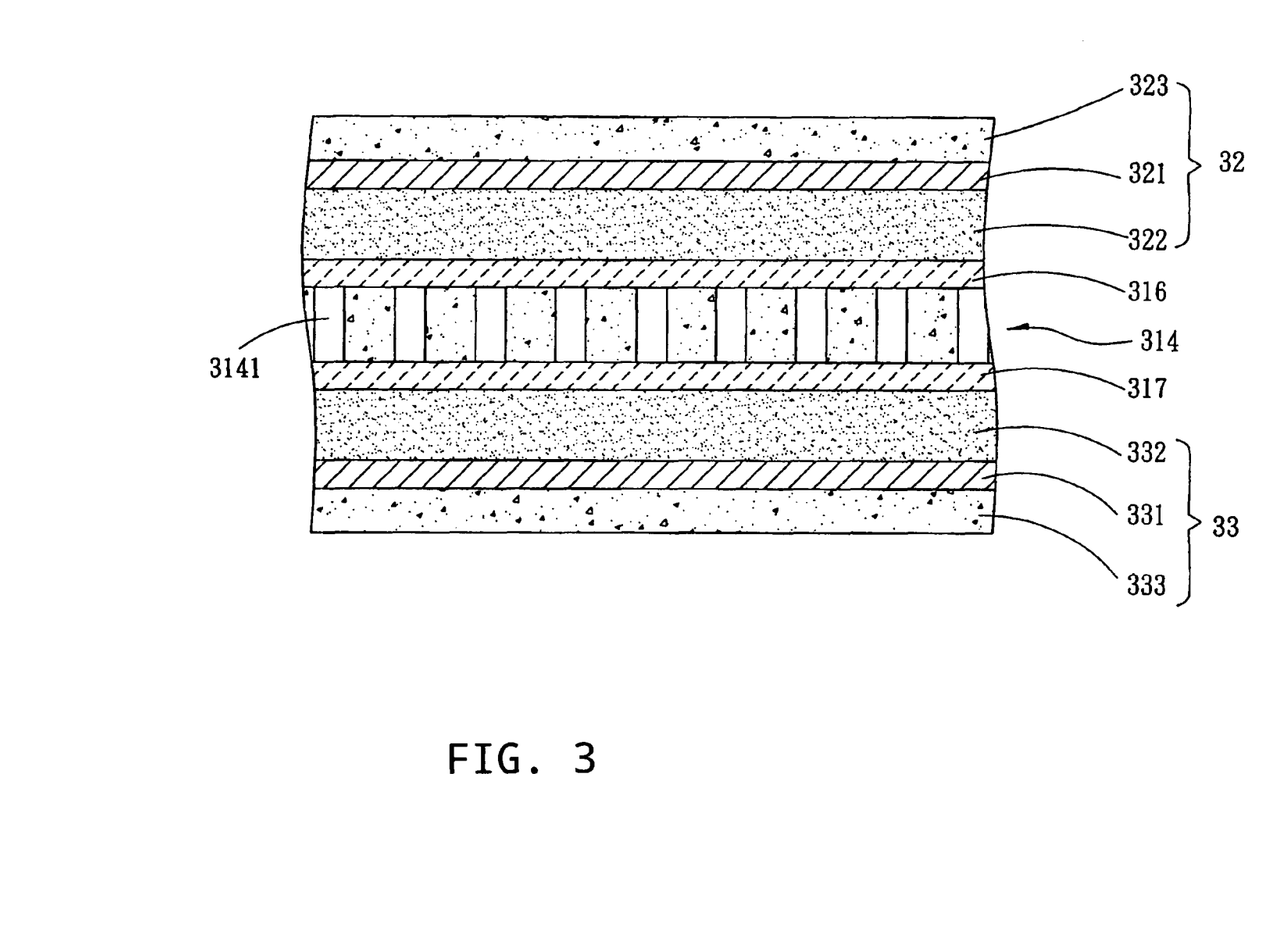
FIG. 3 illustrates a partial cross-section view of the electricity supply system of the present invention.

Please refer to FIG. 3, the first electrode substrate 32 includes a first polymer layer 323, a first current collector 321 and a first active material layer 322. The second electrode substrate 33 includes a second polymer layer 333, a second current collector 331 and a second active material layer 332.

The first polymer layer 323 and the second polymer layer 333 are located most outer region of the first electrode substrate 32 and the second electrode substrate 33, to protect the first current collector 321 and the second current collector 331 without being oxidized during high temperature. Also, the first polymer layer 323 and the second polymer layer 333 enhance the ability of repeat bending for the first electrode substrate 32 and the second electrode substrate 33. The first polymer layer 323 and the second polymer layer 333 may be formed on the first current collector 321 and the second current collector 331 by glue, hot pressing, or screen printing. The material of the first polymer layer 323 and the second polymer layer 333 is PI, PET, PS, PP, PEN, PVC, acrylic acid or EPOXY. The first current collector 321 and the second current collector 331 are utilized to output electric charge, produced by the first active material layer 322 and the second active material layer 332 by the first package unit 34 and the second package unit 35, or wires to the logic circuit area 312. In other words, each package unit is configured to form an electrical path between the current collector and the logic circuitry. The material of the first current collector 321 and the second current collector 331 is Cu, Al, Ni, Sn, Au, Ag or an alloy comprised of at least one of the foregoing metals. By the characteristics of the metal, the first current collector 321 and the second current collector 331 reduce the speed and amount of water permeating into the first active material layer 322 and the second active material layer 332. The first active material layer 322 and the second active material layer 332 are used to perform electrochemistry reaction to convert Electrical energy into Chemical energy or Chemical energy into Electrical energy.

Figure 4:
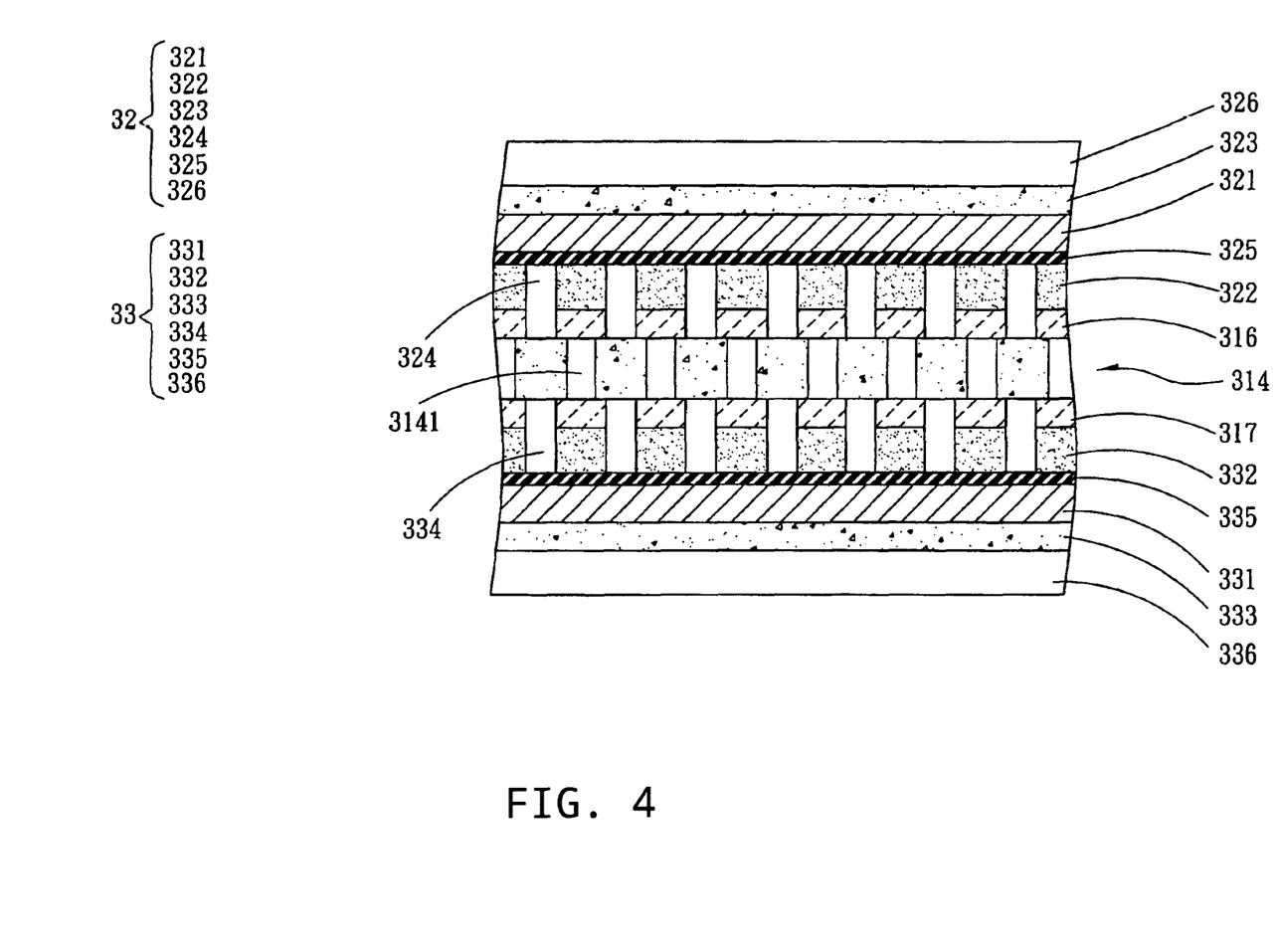
FIG. 4 illustrates another embodiment of a partial cross-section view of the electricity supply system of the present invention.

Please refer to FIG. 4, the first electrode substrate 32 includes a first polymer layer 323, a first current collector 321, a first active material layer 322, a plurality of first dividing unit 324, a first enhanced adhesive layer 325 and a first layout layer 326. The second electrode substrate 33 includes a second polymer layer 333, a second current collector 331, a second active material layer 332, a plurality of second dividing unit 334, a second enhanced adhesive layer 335 and a second layout layer 336.

The first dividing unit 324 is disposed on the first current collector 321 and opposed to the separating area 311 of the circuit substrate 31 to divide the first active material layer 322 into a plurality of first sub-active material layers. The second dividing unit 334 is disposed on the second current collector 321 and opposed to the separating area 311 of the circuit substrate 31 to divide the second active material layer 332 into a plurality of second sub-active material layers. The dividing units 324, 334 are configured to maintain separation between the current collectors 321, 331. Whatever in a normal condition or especially in bending with high temperature, the relational location of the first active material layer 322 and the first current collector 321, the circuit substrate 31 and the first current collector 321, the second active material layer 332 and the second current collector 331, the circuit substrate 31 and the second current collector 331 are kept and maintained. The first dividing unit 324 and the second dividing unit 334 may be formed between the first current collector 321 and the first active material layer 322, the second current collector 331 and the second active material layer 332 by glue, hot pressing, or screen printing. The chemical crosslinking is formed after curing to form the dividing units 324, 334. Therefore, the first current collector 321, the first active material layer 322, and the separating area 311 of the circuit substrate 31 are firmly stuck by the adhesion of the first dividing unit 324. The second current collector 331, the second active material layer 332, and the separating area 311 of the circuit substrate 31 are firmly stuck by the adhesion of the second dividing unit 334. The strength of the structure is enhanced, especially in repeat bending. The material of the dividing units 324, 334 is acrylic acid and/or EPOXY.

The first enhanced adhesive layer 325 is located between the first current collector 321 and the first active material layer 322. The second enhanced adhesive layer 335 is located between the second current collector 331 and the second active material layer 332. The enhanced adhesive layers 325, 335 are utilized to enhance the adhesion between the active material layers 322, 332 and the current collectors 321, 331. The enhanced adhesive layers 325, 335 are formed by coating or printing. The enhanced adhesive layers 325, 335 would form stronger physical crosslinking structure between the enhanced adhesive layers 325, 335 and the active material layers 322, 332. On the other hand, due to the enhanced adhesive layers 325, 335 include more polymer binders, the enhanced adhesive layers 325, 335 and the current collectors 321, 331 would be stuck firmer. The strength of the electricity supply system 3 is enhanced, especially in repeat bending. The enhanced adhesive layers 325, 335 are made of polymer and conductive particles.

The first layout layer 326 is located outside the first polymer layer 323, and the second layout layer 336 is located outside the second polymer layer 333. The layout layers 326, 336 are used to integrate the positive electrode, the negative electrode, the electric element and circuit thereon to serve as circuit substrate. Take an active RFID device as example, the antenna, the feedback circuit, and the RF IC are soldered on the first layout layer 326 of the first electrode substrate 32 to save the space-occupied and the cost.

Please refer to FIGS. 3 and 4, the metal layers 313, 315 are removed on the separating area 311 of the circuit substrate 31, and the substrate polymer layer 314 include a plurality of holes 3141. The holes 3141 pass through the substrate polymer layer 314 of the separating area 311 of the circuit substrate 31 to permit ion migration. To prevent the openings structure to form micro short and heavy load of partial area to make the active material layers 322, 332 aging, the electrical isolator layers 316, 317 are used to cover the holes 3141. Also, the electrical isolator layers 316, 317 enhance the adhesion between the active material layers 322, 332 and the separating area 311 of the circuit substrate 31. The electrical isolator layers 316, 317 are made of polymer and stiffener material. The stiffener material is made of $SiO_2$, $TiO_2$, $AlO_2$, and hydrophobicity treatment is performed on surfaces. The stiffener material increases ionic conductivity and the distance for ion migration. Also, the stiffener material increases capable of electrolyte impregnated. The stiffener material is configured to improve ion conductivity of the insulator electrical isolator layers 316, 317 and to impregnate electrolytes. One or more surfaces of the electrical isolator layers 316, 317 may be hydrophobic surfaces.

The polymer includes one or more of poly vinylidene fluoride (PVDF), poly vinylidene fluoride-hexafluoropropylene (PVDF-HFP), poly ethylene oxide (PEO), poly acrylonitrile (PAN), polyimide (PI), etc. The PI is configured to maintain particles of the stiffener material in place when the electrical isolator layers are adhere to tire the active material layers, thereby preventing the particles from concentration at the interface between the electrical isolator layers and the active material layers. The electrical isolator layers include one layer or a plurality of layers. The plurality of layers may have different composition recipes.

The electrical isolator layers 316, 317 are chemically adhered to the active material layers 322, 332 utilizing one or more of gel electrolyte, plasticizer, etc. though hot lamination. During the adhesion/lamination process, polymer segments, chains, or event backbones of the active material layers 322, 332 and the electrical isolator layers 316, 317 are softened to migrate or rotate. PI in the electrical isolator layers 316, 317 and/or the active material layers 322, 332 maintain stiffener material particles in place, such that the particles may not concentrate at the interface between the active material layers 322, 332 and the electrical isolator layers 316, 317. Advantageously, flexibility at the interface may be maintained, and the electricity supply system 1 is flexible without the electrical isolator layers 316, 317 being detached from the active material layers 322, 332. Accordingly, the electricity supply system 1 may be mechanically and structurally flexible with optimal performance and durability.

In one embodiment, the polymer material may represent about 60% to about 95% by volume of the electrical isolator layers 316, 317, and a stiffener material may represent about 5% to about 40% by volume of the electrical isolator layers 316, 317. The polymer material includes PVDF, PVDF-HFP, PEO, and/or PAN. A solution is formed including the polymer material, the stiffener material, and a solvent, e.g., NMP or Acetone. A non-solvent, e.g., PC or Propanol, with weight of about 0.5 to 3.0 times with the weight of the polymer material may be added to the solution to produce a new solution. Solid content may represent about 5% to about 30% of the new solution, and the solvent may represent about 95% to about 70% of the new solution. The electrical isolator layers 316, 317 are formed on the separating area 311 utilizing the new solution through coating, dipping, and/or spraying with subsequent removal of the solvent and non-solvent.

In another embodiment, the polymer material may represent about 25% to about 40% by volume of the electrical isolator layers 316, 317, and a stiffener material may represent about 75% to about 95% by volume of the electrical isolator layers 316, 317. The polymer material includes PVDF and/or PVDF-HFP. A solution may be formed including the polymer material, the stiffener material, a solvent, and a non-solvent. Solid content may represent about 15% to about 45% of the solution, and the solvent may represent about 85% to about 55% of the solution. The electrical isolator layers 316, 317 are formed on the separating area utilizing the solution through coating, dipping, and/or spraying with subsequent removal of the solvent and non-solvent.

In other embodiment, the polymer material may represent about 5% to about 25% by volume of a first layer of the electrical isolator layers 316, 317, and a stiffener material may represent about 75% to about 95% by volume of the first layer of the electrical isolator layers 316, 317. The polymer material may include PVDF and/or PVDF-HFP. A first solution may be formed including the polymer material, the stiffener material, a solvent, and a non-solvent. Solid content may represent about 15% to about 45% of the first solution, and the solvent may represent about 85% to about 55% of the first solution. The electrical isolator layers 316, 317 may be formed on the separating area 311 utilizing the first solution through coating, dipping, and/or spraying with (subsequent) removal of the solvent and non-solvent.

Figure 5:
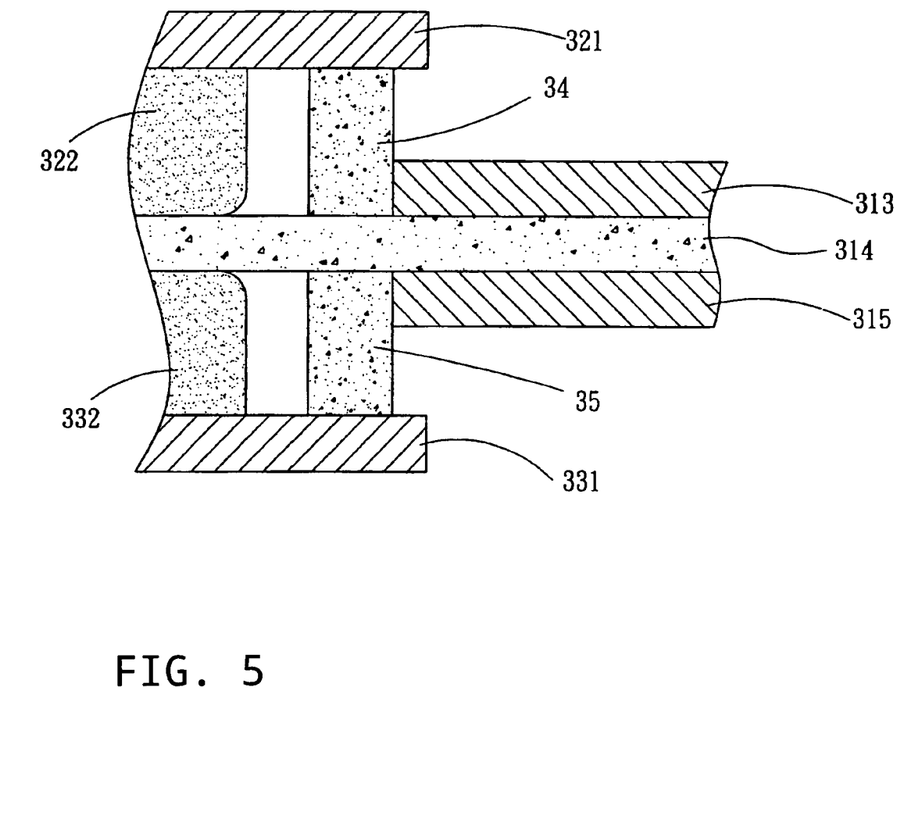
FIG. 5 illustrates an embodiment of the package units of the electricity supply system of the present invention.

Please refer to FIG. 5, is a partial enlargement of a cross-sectional view of FIG. 2. In this embodiment, the essential structures, the first package unit 34 and the second package unit 35, are shown. Please refer to FIG. 6, the electricity supply system 3 further includes a first inactive unit 341, a second inactive unit 351, a first supporting unit 342, and a second supporting unit 352.

Figure 6:
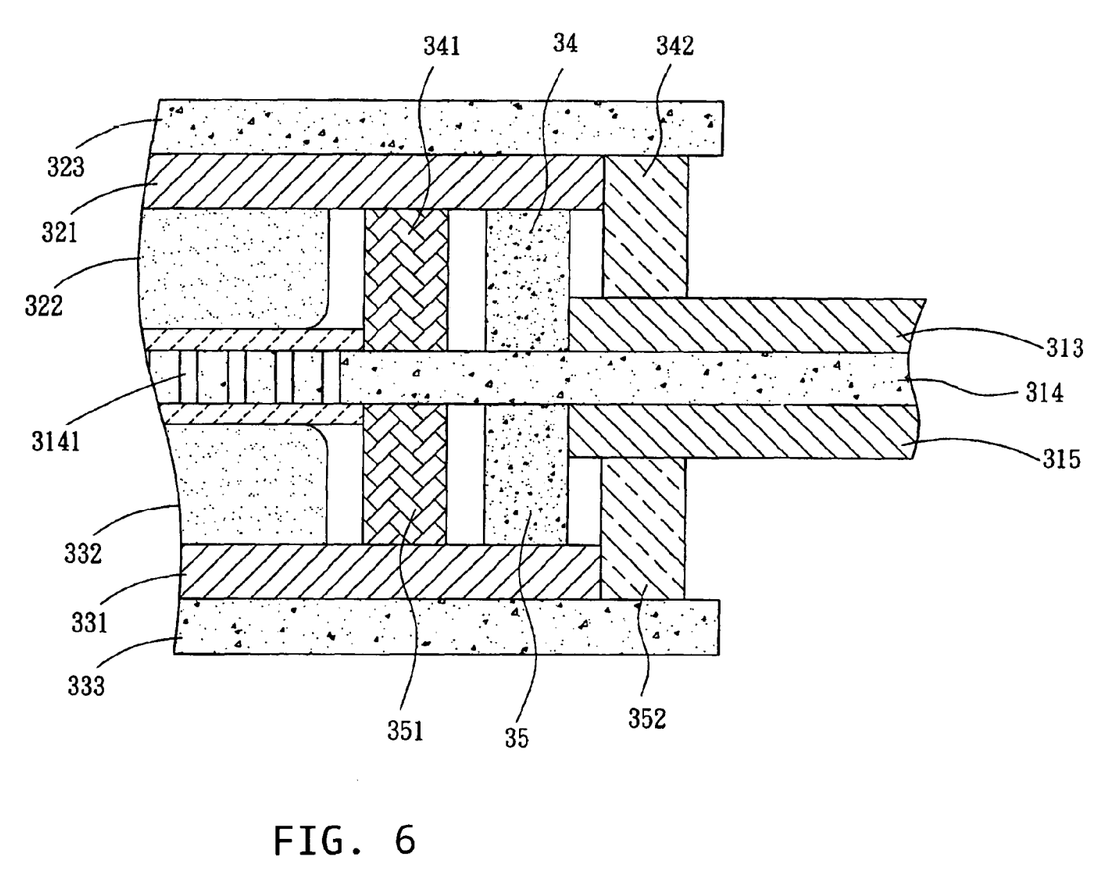
FIG. 6 illustrates another embodiment of the package units of the electricity supply system of the present invention.

Take the first package unit 34 as example, the first package unit 34 is located on the first current collector 321 of the first electrode substrate 32, and opposed to the separating area 311 of the circuit substrate 31. The first package unit 34 may include a first upper package unit, located on located on the first current collector 321 and a first lower package unit, located on the circuit substrate 31 opposed to the first electrode substrate 32. Therefore, the adhesion, conductive ability, and gas barrier effect are improved. The package units 34, 351 have three main functions:

the first active material layer 322 is sealed between the first current collector 321, the separating area 311, and the first package unit 34 to prevent the electrolyte impregnated into the first active material layer 322 to leak and the water outside to permeate.

the strength of the electricity supply system 3 is enhanced, especially in repeat bending, by the well-adhesion of the first package unit 34 and the first electrode substrate 32/the circuit substrate 31.

electricity is outputted directly to the logic circuit area 312 by the first package unit 34 without extra pads.

The material of the first package unit 34 is glue, metal, glass fiber or combined thereof. When the first package unit 34 is made of glue. The glue may be PI, Epoxy or acrylic acid. The glue may also combine with gas-barrier material, such as glass fiber or metal or combine with conductive particles, which is made of Au, Ag, Sn, Ni, Al, Cu, Pt, or conductive carbon powder. When the first package unit 34 is made of metal, such as Cu, Al, Ni, AG, Au, or Sn.

The first inactive unit 341 disposed between the first active material layer 322 and the first package unit 34, and a second inactive unit 351 disposed between the second active material layer 332 and the second package unit 35. The inactive units 341, 342 being electrically non-conductive and inactivate to the active material layers 322, 332. Take the first inactive unit 341 as example, the first inactive unit 341 has three main functions:

the first active material layer 322 is sealed between the first current collector 321, the separating area 311, and the inactive unit 341 to prevent the electrolyte impregnated into the first active material layer 322 to leak to damage the adhesion of the first package unit 34.

the problems including Li precipitation can be decreased.

ions dissolved of the frame-metal due to electrochemical stable.

The material of the first inactive unit 341 is glue, metal, high electrochemical stable material or combined thereof. When the first inactive unit 341 is made of glue. The glue may be PI, Epoxy or acrylic acid. The glue may also combine with high electrochemical stable material, such as glass fiber. When the first package unit 34 is made of metal, such as Cu, Al, Ni, AG, Au, or Sn.

The first supporting unit 342 disposed between the first electrode substrate 32 and the circuit substrate 31, and outside of the first package unit 34. The second supporting unit 352 disposed between the second electrode substrate 33 and the circuit substrate 31, and outside of the second package unit 35. Take the first supporting unit 342 as example, the first supporting unit 342 has two main functions:

the current collector 321 and the first metal layer 313 are insulated to prevent short during manufacture.

the first metal layer 313 and the second metal layer 315 are insulated to prevent short during manufacture.

As can be appreciated from the foregoing, embodiments of the present invention may improve efficiency in manufacturing the electronic devices. In general a circuit substrate can withstand high temperatures, such as a temperature higher than 300° C. Therefore, one or more mass production techniques, such as tin reflow, surface mount technology (SMT), etc, may be utilized to integrate the electricity supply systems on the circuit substrates or circuit boards. For example, in one or more embodiments, the electricity supply systems may represent SMT components installed during the same SMT process for installing functional components. With the number of processes reduced, efficiency may be improved, and manufacturing costs of electronic devices may be reduced.

Further, with the integration of the electricity supply systems and functional modules, manufacturing and material costs for providing packaging and electrical coupling may be reduced. Form factors of electronic devices also may be reduced.

Since electricity supply components may be deployed on a circuit substrate with substantial maneuverability, embodiments of the invention may also provide more possibilities for electronic component layout. Accordingly, flexibility and variety of electronic device design may be provided.

Embodiments of the invention also provide improved structural/mechanical flexibility of electricity supply systems and/or electronic devices.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A lithium battery, comprising:
a circuit substrate, including at least one separating area;
a first electrode substrate, disposed on one side of the circuit substrate and including a first current collector and a first active material layer, wherein the first active material layer is disposed opposed to the separating area and is located between the separating area and the first current collector;
a second electrode substrate, disposed on another side of the circuit substrate and including a second current collector and a second active material layer, wherein the second active material layer is disposed opposed to the separating area and is located between the separating area and the second current collector;

a first package unit, located between the first electrode substrate and the circuit substrate, and disposed around the edge of the first active material layer; and a second package unit, located between the second electrode substrate and the circuit substrate, and disposed around the edge of the second active material layer.

2. The lithium battery of claim 1, wherein the circuit substrate further including a logic circuit area adjacent to the separating area and electrically connected with the first and the second current collectors, wherein the logic circuit area is adapted to dispose a logic circuitry.

3. The lithium battery of claim 2, wherein the logic circuitry is connected to the first and the second current collectors respectively by wires.

4. The lithium battery of claim 2, wherein each package unit is configured to form an electrical path between the current collector and the logic circuitry.

5. The lithium battery of claim 1, wherein the circuit substrate is a flexible circuit board or a rigid circuit board.

6. The lithium battery of claim 1, wherein the circuit substrate is formed of a material including polyimide (PI), polyethylene terephthalate (PET), polyethylene naphthalate (PEN), glass fiber, and liquid crystal polymer.

7. The lithium battery of claim 1, wherein the circuit substrate further includes a first metal layer, a second metal layer and a substrate polymer layer, the first metal layer and the second metal layer are disposed on two sides of the substrate polymer layer without opposing the separating area.

8. The lithium battery of claim 1, wherein the circuit substrate includes a plurality of holes on the separating area.

9. The lithium battery of claim 8, wherein the circuit substrate includes an electrical isolator layer to cover the holes.

10. The lithium battery of claim 9, further comprising electrolyte impregnated into the electrical isolator layer, the first active material layer and the second active material layer.

11. The lithium battery of claim 1, further comprising a first polymer layer covering the first current collector and a second polymer layer covering the second current collector, wherein the first electrode substrate and the second electrode substrate are located between the first and the second polymer layers.

12. The lithium battery of claim 1, wherein the first and the second package units having a material, and the material of the first and the second package units is glue, metal, fiberglass, and combinations thereof.

13. The lithium battery of claim 1, wherein the first and the second package units are doped with conductive particles.

14. The lithium battery of claim 1, further comprising a first inactive unit disposed between the first active material layer and the first package unit, and a second inactive unit disposed between the second active material layer and the second package unit, the inactive units being electrically non-conductive and inactivate to the active material layers.

15. The lithium battery of claim 1, wherein the first electrode substrate further comprises a first layout layer disposed outside of the first current collector to make the first current collector locate between the first layout layer and the first active material layer; and a second layout layer disposed outside of the second current collector to make the second current collector locate between the second layout layer and the second active material layer.

16. The lithium battery of claim 15, wherein the first layout layer and the second layout layer are electrically connected to the first current collector and the second current collector respectively.

17. The lithium battery of claim 1, wherein the first electrode substrate further comprises at least one first dividing unit disposed on the first current collector to divide the first active material layer into a plurality of first sub-active material layers; the second electrode substrate further comprises at least one second dividing unit disposed on the second current collector to divide the second active material layer into a plurality of second sub-active material layers, wherein the dividing units are configured to maintain separation between the current collectors.

18. The lithium battery of claim 17, further comprising a first supporting unit disposed between the first electrode substrate and the circuit substrate, and outside of the first package unit.

19. The lithium battery of claim 18, further comprising a second supporting unit disposed between the second electrode substrate and the circuit substrate, and outside of the first package unit.

* * * * *